United States Patent [19]
Albert et al.

[11] 3,975,603
[45] Aug. 17, 1976

[54] EARTHQUAKE RESISTANT SWITCHGEAR

[75] Inventors: Willard S. Albert, Trafford; August P. Colaiaco, Wilkinsburg, both of Pa.

[73] Assignee: Westinghouse Electric Corporation, Pittsburgh, Pa.

[22] Filed: Jan. 2, 1975

[21] Appl. No.: 538,064

[52] U.S. Cl................................. 200/301; 52/167; 188/1 B
[51] Int. Cl.²......................................... H01H 3/60
[58] Field of Search............ 200/301, 48 R; 52/167, 52/173; 248/358 R; 343/DIG. 1; 188/1 B

[56] References Cited
UNITED STATES PATENTS

| | | | |
|---|---|---|---|
| 2,035,143 | 3/1936 | Cavaglieri | 52/167 |
| 2,064,791 | 12/1936 | Faber | 52/167 |

*Primary Examiner*—Herman T. Hohauser
*Attorney, Agent, or Firm*—L. P. Johns

[57] ABSTRACT

A metal-enclosed switchgear characterized by a metal enclosure having a rear wall, opposite side walls, a bottom wall, and a front opening with a door therefor. A circuit breaker is removably located in the enclosure and comprises a plurality of arc chutes and an electrically insulating barrier wall on each side of and spaced from each arc chute. In addition, the metal enclosed switchgear comprises stabilizing means for increasing their natural frequency and preventing relative motion between adjacent components of the enclosure and the switchgear in response to ambient vibratory forces which means comprises first spacers of electrically insulating material in the spaces between each arc chute and each adjacent barrier wall, second spacers of electrically insulating material mounted on each opposite side wall and in the space between the side wall and the adjacent barrier wall. The metal enclosed switchgear also comprises first hold down means on the bottom wall near the rear wall and engageable with cooperating hold down means on the circuit breaker and engageable therewith when the circuit breaker is completely installed within the enclosure, second hold down members are likewise provided on the bottom wall and near the front openings and engageable with cooperating erasable means on the circuit breaker adjacent thereto. Moreover, the door comprises spaced stiffeners for increasing the frequency of door sections between the stiffeners in response to and at a frequency greater than that of seismic vibration.

9 Claims, 5 Drawing Figures

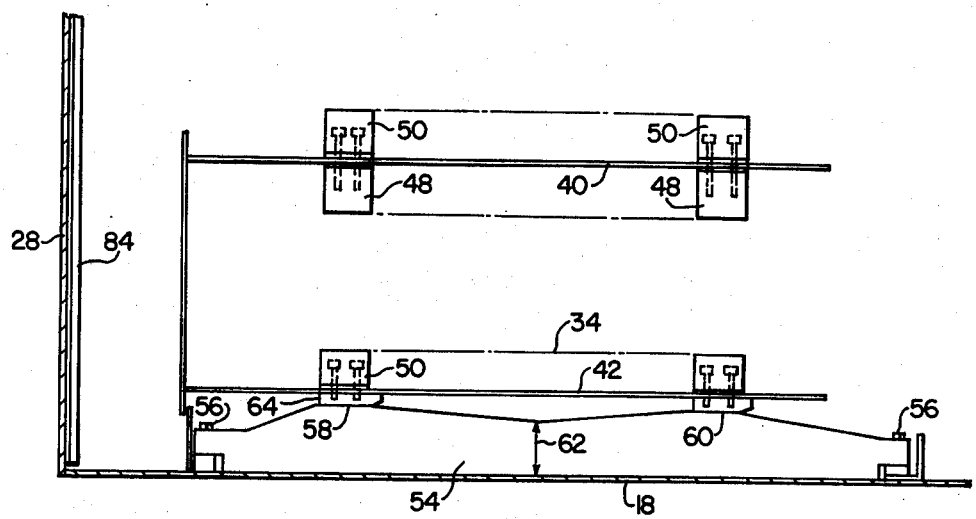
FIG. 3.
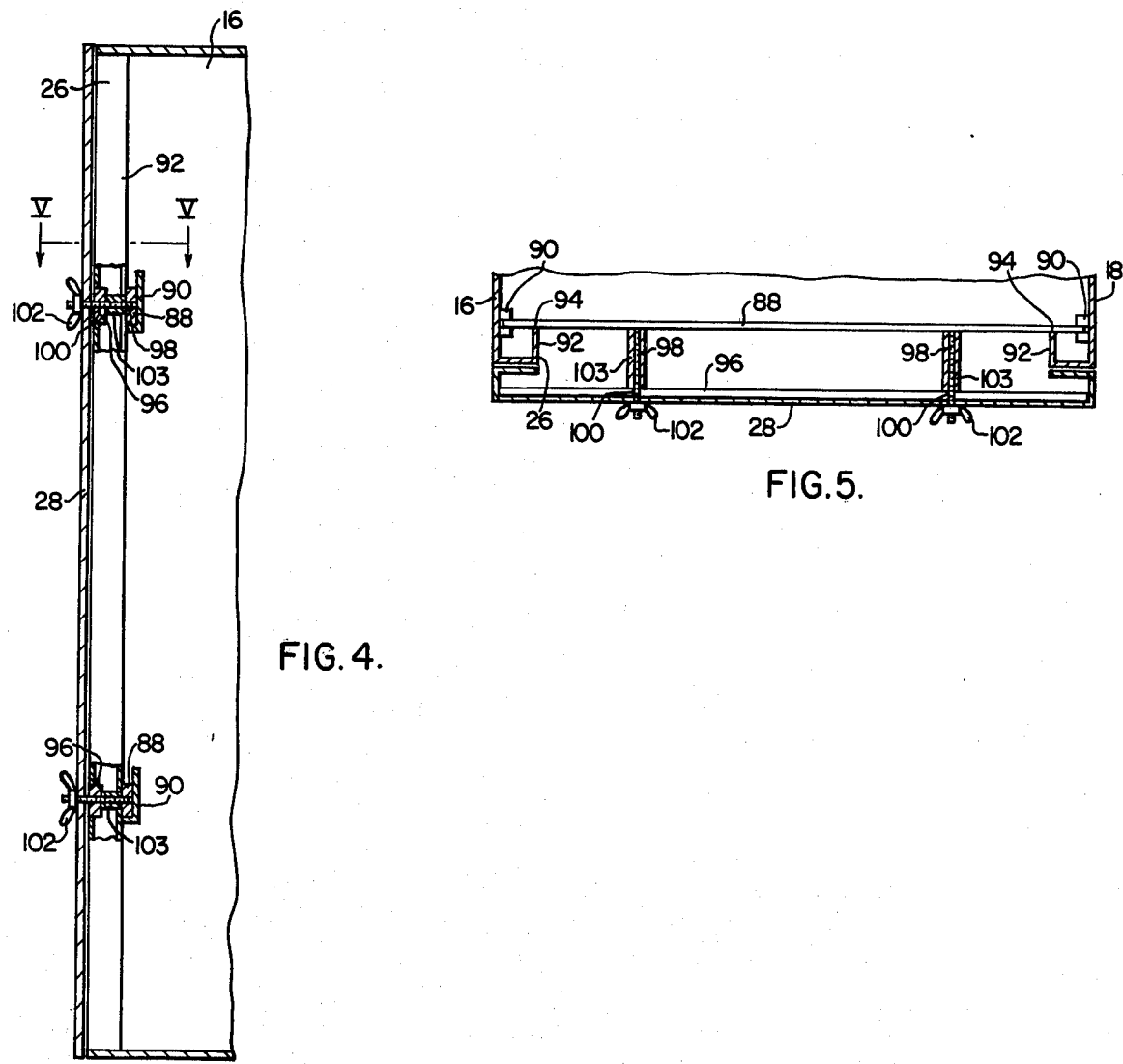
FIG. 4.
FIG. 5.

EARTHQUAKE RESISTANT SWITCHGEAR

BACKGROUND OF THE INVENTION

1. Field of the Invention

This invention relates to metal enclosed switchgear and more particularly it pertains to switchgear adapted to resist the damaging effects of an earthquake.

2. Description of the Prior Art

As a result of the detrimental effect of earthquakes there have been an increasing number of specifications requiring a metal-clad switchgear assembly having to withstand the seismic effects resulting from earthquakes. The specifications have been particularly referenced to switchgear for nuclear powered generating stations so that the switchgear can withstand the seismic forces without damage or interruption of functions. It has been found that resonant vibrations within the switchgear produce forces that can cause damage or malfunction particularly where relative motion can occur between the components of the switchgear. Heretofore, metal-clad switchgear assemblies have not been provided with effective means for stabilizing relative motion between adjacent components of a circuit breaker and the housing in which it is contained.

SUMMARY OF THE INVENTION

In accordance with this invention it has been found that the foregoing problem may be overcome by providing metal enclosed switchgear comprising an enclosure having a rear wall, opposite side walls, a bottom wall, and a front opening, a door for the front opening, a circuit breaker removably disposed within the enclosure, the circuit breaker comprising at least one arc chute and an insulating wall on each side and spaced from the arc chute, stabilizing means for preventing relative motion between the adjacent components of the enclosure and the circuit breaker in response to ambient vibratory forces, the stabilizing means comprising first spacers of electrically insulating material between the arc chute and each barrier wall, the stabilizing means also comprising second spacers of electrically insulating material mounted on each opposite side wall and occupying the space between the side wall and a corresponding adjacent barrier wall, the second spacers being elongated members having at least two spaced points of contact with said barrier walls, the circuit breaker being movable into and out the enclosure through the front opening, first holddown members on the bottom wall near the rear wall and engageable with cooperating means on the circuit breaker when the circuit breaker is moved into the enclosure, second hold down members on the bottom wall near the front opening and comprising a cooperating releasable member on the circuit breaker, and the door comprising spaced stiffeners to increase the vibration frequency of door sections between the stiffeners in response to and at a frequency greater than that of seismic vibrations.

The advantage of the metal-enclosed switchgear of the invention is that it prevents and reduces relative rocking motion between critical components and thereby reduces the changes of damage; it prevents sliding motion and/or bouncing between critical components; and it increases the natural frequency of the component, to reduce its tendency to resonate with the typical low frequencies associated with buildings, ground and seismic frequencies.

BRIEF DESCRIPTION OF THE DRAWINGS

FIG. 3 is a horizontal sectional view taken along the line III—III of FIG. 1;

FIG. 4 is a vertical sectional view showing another embodiment of the door stiffening structure; and FIG. 5 is a horizontal sectional view taken along the line V—V of FIG. 4.

DESCRIPTION OF THE PREFERRED EMBODIMENTS

Figure 1:
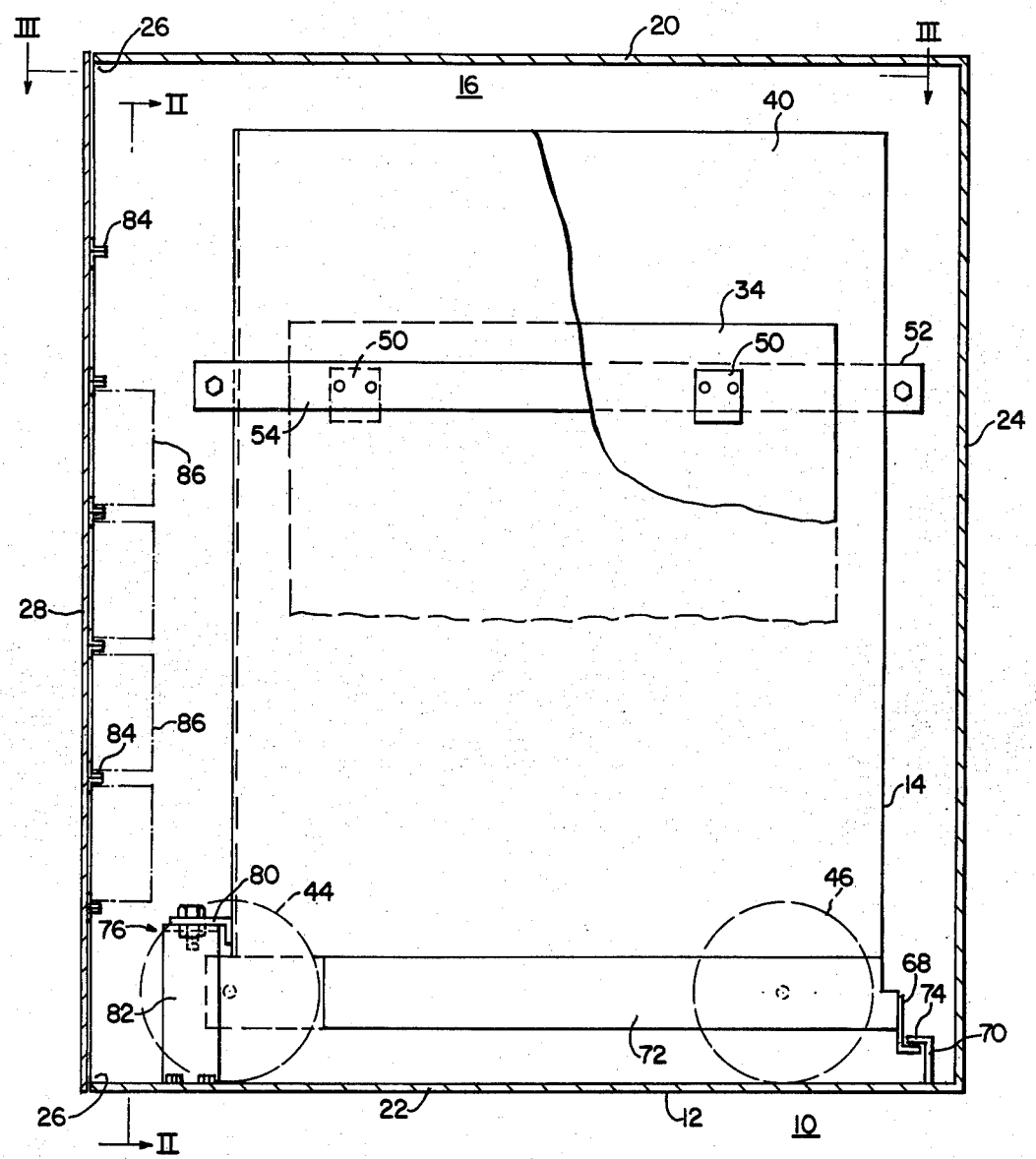
FIG. 1 is a vertical sectional view taken along the line I—I of FIG. 2.

In FIG. 1 a switchgear unit is generally indicated at 10 and is a generally rectangular upstanding structure which comprises an enclosure or cell 12 and a circuit breaker generally indicated at 14. The enclosure or cell 12 comprises opposite side walls 16 and 18 (FIG. 2), top and bottom walls 20, 22 rear wall 24, a front opening 26, and a door 28. The cell 12 serves as a housing in which the circuit breaker 14 is normally disposed.

Figure 2:
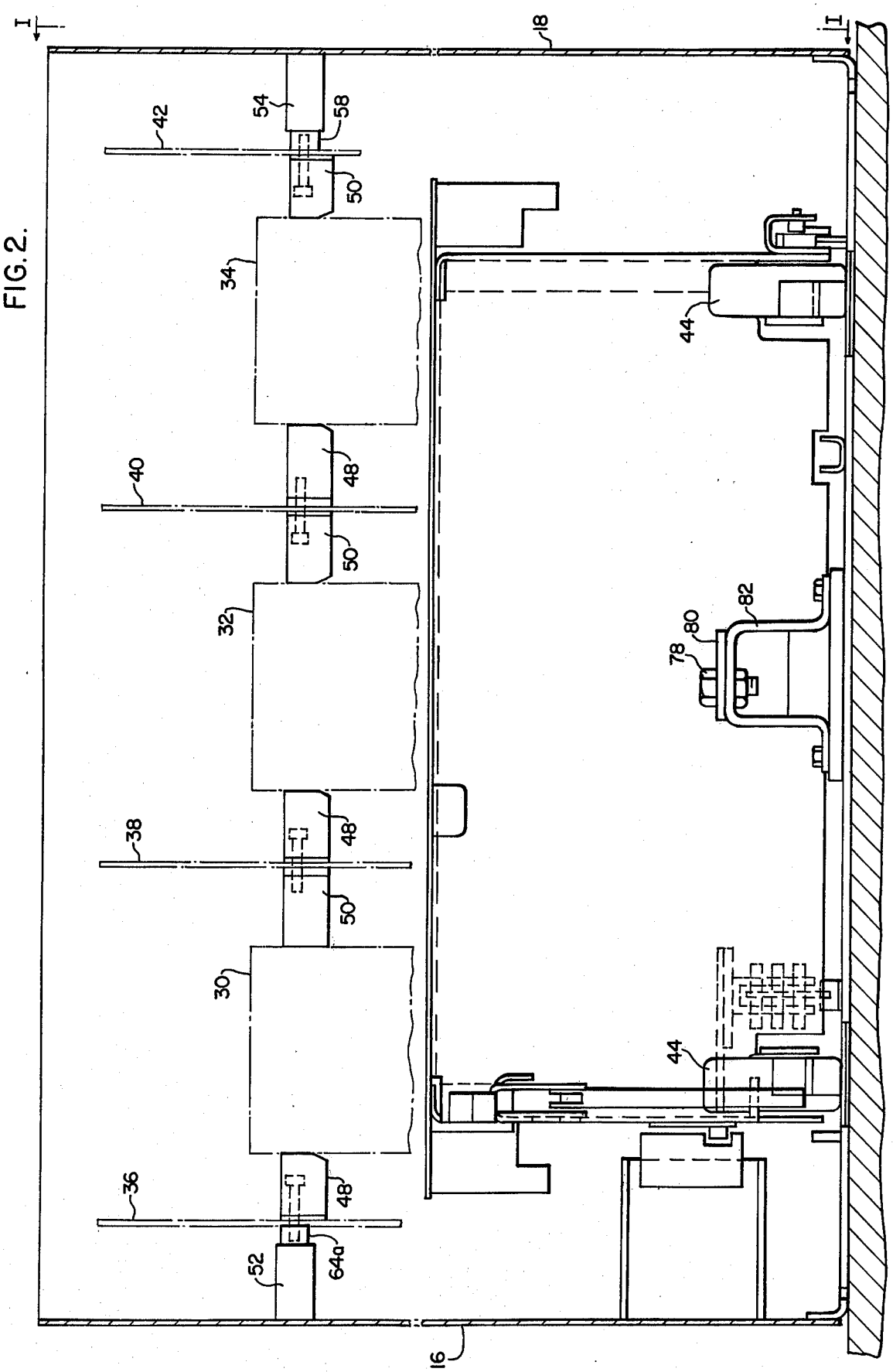
FIG. 2 is a vertical sectional view taken along the line II—II of FIG. 1.

The circuit breaker 14 may be one of several types having electrically insulating barriers, such as generally described in U.S. Pat. No. 3,793,494, issued Feb. 19, 1974. Briefly, it is a multipole, such as three-pole, unit which among other things comprises three arc chutes 30, 32, 34 (FIG. 2) which are disposed between spaced vertically disposed barriers, 36, 38, 40 and 42 which are composed of electrically insulating material. Manifestly, the purpose of the insulating barriers 36-42 is to provide insulating conditions between the separate arc chute 30, 32, 34 of a conventional construction.

Where the circuit breaker 14 is of such a size that manual handling is difficult, the circuit breaker is preferably mounted on wheels or casters 44, 46 whereby the circuit breaker may be rolled into and out of the cell 12 through the front opening 26. It has been found in accordance with this invention that where the switchgear unit 10 is located in a place where it is subject to ambient shock waves such as those resulting from an earthquake or on board a naval vessel, or due to wave or storm action, stabilizing means for preventing relative motion between adjacent parts and components of the cell 12 and the circuit breaker 16 are necessary in order to maintain the functions for which the circuit breaker 14 is installed. As shown in FIGS. 1 and 2 stabilizing means comprise pairs of spacers 48, 50 between each arc chute 30, 32, 34 and adjacent pairs of barriers 36–42. For example, a pair of spacers 50 are mounted on the barrier 40 (FIGS. 1 and 2) and extend towards the contact the same side of the arc chute 32. Similarly another pair of spacers 48, one of which is shown in FIG. 2 are mounted on the barrier 40 and extend towards and contact the opposite side of the arc chute 34. Thus each pair of spacers 48–50 cooperate to maintain the arc chute 32 in place. In a similar manner pairs of spacers 48 and 50 are mounted on the barriers 36, 38 and 42 to cooperate in maintaining the arc chutes 30, 34 in the desired position in the event of the occurrence of an unusual force like a seismic wave. The spacers 48, 50 are composed of insulating material such as glass polyester.

The stabilizing means of this invention likewise comprise a pair of spacers 52, 54 of insulating material such as glass polyester. The spacers 52, 54 are mounted on the side walls 16, 18, respectively, with the spacer 52 extending toward and contacting the barrier spacer 64a and the spacer 54 contacting the barrier spacer 58. The spacers, 52, 54 are elongated members and as shown in FIG. 3 the spacer 54 is substantially coextensive with the circuit breaker 14 and the barrier 42. Opposite ends of the spacer 54 are secured to the inner side of the wall 18 in a suitable manner such as by bolts 56. Each spacer 52, 54 comprises at least two spaced points 58, 60 which comprise the widest point of the elongated spacer and a narrower intermediate section 62 is disclosed therebetween. The points 58, 60 engage spacer guides 64, 66 which may be mounted on the side of the barrier 42 for engagement with the points 58, 60 respectively. A similar structure is provided on the opposite side of the circuit breaker 14 whereby the spacer 52, similar to the spacer 54, engages either the barrier 36 or a spacer guide 64a as shown in FIG. 2.

In accordance with this invention the stabilizing means likewise includes cooperating hold down members comprising a pair of angles 68 and an angle clamp 70. One of the angles 68 is shown in FIG. 1 and is attached to the end of the base or truck 72 of the circuit breaker and is engaged by a flange 74 of the angle clamp 70 which in turn is secured to the bottom wall 22 near the rear wall 24. Similar pairs of angles 68 and angle clamps 70 are provided at transversely spaced positions on the truck 72. Accordingly, when the circuit breaker 14 is completely installed within the cell 12, the angles 68 and angle clamp 70 are engaged in a hold down manner.

As shown in FIGS. 1 and 2 the stabilizing means likewise comprises hold down means generally indicated at 76 at the end of the truck 72 adjacent the door 28. Generally, the hold down means 76 comprises manually fastening means such as a bolt 78 extending through an arm 80 on the truck 72 of the circuit breaker and an inverted channel 82 which is secured in a suitable manner to the bottom wall 22 of the cell 12. Accordingly, when the circuit breaker 14 is completely installed within the cell 12, the rear hold down means including the angles 72 and angle clamps 70 are engaged and the bolt 78 ties the front end of the circuit breaker down to the floor of the cell. The assembly of the bolt 78, arm 80 and channel 82 is substantially centrally disposed with respect to opposite sides of the circuit breaker.

The stabilizing means for maintaining the circuit breaker intact during ambient vibratory forces may likewise comprise reenforcing means for the door 28. As shown more particularly in FIGS. 1 and 3 the door 28 is provided with stiffening members or bars 84 which are preferably exposed horizontally at vertically spaced intervals on the inner surface of the door. It is understood however that the bars may be disposed vertically at horizontally spaced intervals or at other positions such as at inclined angles to the vertical axis. The stiffeners 84 are tightly secured to the door 28 in a suitable manner such as by welding in order to divide the door into smaller sections that would have higher natural frequencies than those of any seismic effect. That is without the bars 84 the door 28 would vibrate at a lower frequency from one end to the other which frequency may approximate that of seismic waves resulting from an earthquake. By adding the bars 84 the natural frequency of vibration of the intermediate door sections is increased to a level above that of seismic frequencies. Accordingly, damage to the door and contents of the cell 12 due to an otherwise resonant effect is avoided.

Moreover, the availability of providing the bars 84 is particularly important because the inner surface of the door is frequently used for the purpose of mounting meters and relays 86 and other expensive instruments.

In accordance with this invention the stabilizing means may involve another embodiment for stiffening the door 28. As shown in FIGS. 4 and 5 a plurality such as two mounting bars 88 are each disposed between a pair of mounting brackets 90 which are secured to opposite sides of the cell on facing surfaces of the walls 16, 18 and adjacent to the front opening 26 of the cell as shown in FIGS. 4 and 5. The front opening 26 may be provided with a formed channel or equivalent to form vertical portions or flanges 92. Such flanges may provide additional reenforcements for the horizontally disposed bars 88 by providing contact point at 94.

In addition to the mounting bars 88 corresponding stiffening the bars 96 are secured to the inner surface of the door 28 such as by welding. The stiffening bars 96 are disposed at vertically spaced intervals across the door in order to provide smaller door sections of vibration in the event of a seismic disturbance. Each mounting bar 88 includes a plurality of spaced bolts 98 which extend substantially horizontally from the bar. Each bolt also extends through a sleeve 103, one end of which is welded to the bar 88. Each bolt 98 extends through a hole 100 in the bar and the door 28. The outer end portions of the bolts 98 have suitable fastening means, such as wing nuts 102, secured thereon in order to hold the door tightly against the door frame formed by the vertical portions or flanges 92. Thus the door 28 is divided into several panels having a natural frequency greater than that of a single large door panel which as found by laboratory tests will have resonant frequencies within seismic frequency range.

Accordingly, the device of the present invention provides means to increase the component frequencies beyond those associated with seismic disturbance and substantially reducing or eliminating the damaging effect of resonance and provides stabilizing means for preventing relative motion not only between adjacent parts of the circuit breaker but also between the circuit breaker and the enclosing cell and components thereof.

What is claimed is:

1. Metal-enclosed switchgear for decreasing resonance vibrations comprising an enclosure including a rear wall, opposite side walls, a bottom wall, and an access opening, a door for the access opening, the door comprising spaced stiffener means to increase the vibration frequency of the door sections between said means in response to and at a frequency greater than that of seismic vibrations, a circuit breaker removably disposed within the enclosure, stabilizing means for preventing relative motion between adjacent components of the enclosure and the circuit breaker in response to ambient vibratory forces, the circuit breaker comprising at least one arc chute and an insulating barrier wall on each side of the arc chute spaced from the arc chute, and said means comprising first spacers of electrically insulating material between the arc chute and each barrier wall.

2. The metal-enclosed switchgear of claim 1 in which said first spacers are mounted on said barrier walls and extend toward and contact opposite sides of the arc chute.

3. The metal-enclosed switchgear of claim 1 in which the stabilizing means comprises second spacers of electrically insulating material mounted on each opposite side wall and extending toward and contacting a corresponding barrier wall on opposite sides of the arc chute.

4. The metal-enclosed switchgear of claim 3 in which the second spacers are elongated members substantially coextensive with the barrier walls.

5. The metal-enclosed switchgear of claim 4 in which said second spacers comprise at least two spaced points of contact with the barrier walls.

6. The metal-enclosed switchgear of claim 1 in which the circuit breaker is movable into and out of the enclosure through the access opening, and first hold down members on the bottom wall near the rear wall and engageable with cooperating means on the circuit breaker when the circuit breaker is moved into the enclosure.

7. The metal-enclosed switchgear of claim 6 in which the hold down members are provided on the bottom wall near the front opening and comprises a cooperating releasable member on the circuit breaker.

8. The metal-enclosed switchgear of claim 5 in which the circuit breaker is movable into and out of the enclosure through the access opening, first hold down members on the bottom wall and near the rear wall and engageable with cooperating means on the circuit breaker when the circuit breaker is moved into the enclosure, second hold down members on the bottom wall near the access opening and comprising a cooperable releasable member on the circuit breaker.

9. Metal-enclosed switchgear comprising an enclosure including a rear wall, opposite side walls, a bottom wall, and an access opening, a door for the access opening, a circuit breaker removably disposed within the enclosure, stabilizing means for causing the door to vibrate at a frequency greater than that of a seismic frequency, and said means comprising stiffening members secured to the door surface at spaced locations therealong.

* * * * *